United States Patent
Herman et al.

(10) Patent No.: US 10,953,471 B2
(45) Date of Patent: Mar. 23, 2021

(54) EXTERNAL TURNING TOOL HAVING A CUTTING PORTION WITH A TRANSVERSE ELONGATED DAMPING MECHANISM

(71) Applicant: Iscar, Ltd., Tefen (IL)

(72) Inventors: Meir Herman, Nahariya (IL); Jony Saffouri, Natereth Eilit (IL); Meir Bar Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/953,726

(22) Filed: Apr. 16, 2018

(65) Prior Publication Data
US 2019/0314902 A1    Oct. 17, 2019

(51) Int. Cl.
*B23B 29/02* (2006.01)
*B23B 27/00* (2006.01)

(52) U.S. Cl.
CPC .......... *B23B 27/002* (2013.01); *B23B 29/022* (2013.01); *B23B 2250/12* (2013.01); *B23B 2250/16* (2013.01)

(58) Field of Classification Search
CPC ..... B23B 27/002; B23B 27/10; B23B 29/022; B23B 2250/16; B23B 2250/12
See application file for complete search history.

(56) References Cited

U.S. PATENT DOCUMENTS

| | | | |
|---|---|---|---|
| 3,576,060 A * | 4/1971 | Stein | B23B 27/002 407/117 |
| 3,642,378 A * | 2/1972 | Hahn | B23B 29/022 408/143 |
| 3,715,939 A | 2/1973 | Leschenne | |
| 3,774,730 A | 11/1973 | Maddux | |
| 3,923,414 A * | 12/1975 | Hopkins | B23B 29/022 408/143 |
| 4,616,738 A * | 10/1986 | Shurtliff | B23B 29/022 188/380 |
| 5,332,339 A * | 7/1994 | Nakayama | B23B 27/00 407/101 |
| 6,113,319 A | 9/2000 | Hansson et al. | |
| 6,443,673 B1 | 9/2002 | Etling et al. | |
| 7,128,501 B1 * | 10/2006 | Sipos | B23B 27/167 407/107 |
| 7,234,379 B2 | 6/2007 | Claesson et al. | |

(Continued)

FOREIGN PATENT DOCUMENTS

| | | |
|---|---|---|
| CA | 3034638 | 3/2018 |
| JP | H 073903 U | 1/1995 |

(Continued)

OTHER PUBLICATIONS

Description JP2003334702 (translation) obtained at https://worldwide.espacenet.com/ (last visited Dec. 4, 2019).*

(Continued)

*Primary Examiner* — Ryan C Rufo
(74) *Attorney, Agent, or Firm* — Womble Bond Dickinson (US) LLP (57) ABSTRACT

An external turning tool includes an elongated tool body with opposite clamping and cutting portions which define an axial direction therebetween. The cutting portion includes a damping mechanism with an elongated damping member which defines an elongation axis. The elongation axis forms a non-zero damping member angle with the axial direction.

29 Claims, 5 Drawing Sheets

(56) References Cited

U.S. PATENT DOCUMENTS

| | | |
|---|---|---|
| 8,946,585 B2 | 2/2015 | Kappmeyer |
| 9,574,634 B2 * | 2/2017 | Lin .......................... F16F 7/10 |
| 9,579,730 B2 | 2/2017 | Frota De Souza Filho |
| 2003/0147707 A1 | 8/2003 | Perkowski |
| 2005/0109182 A1 * | 5/2005 | Murakami ............ B23B 27/002 |
| | | 83/651 |
| 2005/0279598 A1 * | 12/2005 | McPherson ............. F16F 7/108 |
| | | 188/378 |
| 2007/0089574 A1 * | 4/2007 | Murakami ............ B23B 27/002 |
| | | 82/158 |
| 2008/0131215 A1 * | 6/2008 | Sjoo ........................ B23B 27/04 |
| | | 407/110 |
| 2011/0229278 A1 | 9/2011 | Sjöö |
| 2013/0004250 A1 | 1/2013 | Gamble |
| 2015/0056025 A1 * | 2/2015 | Guo ........................ B23C 5/003 |
| | | 407/33 |
| 2016/0008892 A1 | 1/2016 | Haimer |
| 2016/0045960 A1 | 2/2016 | Hecht |
| 2016/0305503 A1 | 10/2016 | Freyermuth et al. |
| 2017/0173701 A1 | 6/2017 | Hecht et al. |

FOREIGN PATENT DOCUMENTS

| | | | | |
|---|---|---|---|---|
| JP | 09300111 | A * | 11/1997 | |
| JP | 2000288822 | A * | 10/2000 | ........... B23C 5/1045 |
| JP | 2002079405 | A * | 3/2002 | ........... B23B 29/022 |
| JP | 2002154003 | A * | 5/2002 | |
| JP | 2003 062703 | A | 3/2003 | |
| JP | 2003062703 | A * | 3/2003 | |
| JP | 2003062704 | A * | 3/2003 | |
| JP | 2003334702 | A * | 11/2003 | |
| JP | 2005305600 | A * | 11/2005 | |
| JP | 2005329535 | A * | 12/2005 | |
| JP | 2009166239 | A * | 7/2009 | ........... B23B 29/022 |
| JP | 2011 042007 | A | 3/2011 | |
| KR | 2012 0069195 | A | 6/2012 | |
| RU | 1816538 | A1 * | 5/1993 | |
| RU | 2011478 | C1 * | 4/1994 | |
| SU | 545416 | A * | 4/1977 | |
| SU | 1134300 | A * | 1/1985 | |
| WO | WO 2012/084688 | | 6/2012 | |
| WO | WO-2017162416 | A1 * | 9/2017 | ........... B23B 27/002 |

OTHER PUBLICATIONS

Description JP2002079405 (translation) obtained at https://worldwide.espacenet.com/ (last visited May 12, 2020).*
International Search Report dated Jun. 28, 2019, issued in PCT counterpart application (No. PCT/IL2019/050262).
Written Opinion dated Jun. 28, 2019, issued in PCT counterpart application (No. PCT/IL2019/050262).

* cited by examiner

EXTERNAL TURNING TOOL HAVING A CUTTING PORTION WITH A TRANSVERSE ELONGATED DAMPING MECHANISM

FIELD OF THE INVENTION

The subject matter of the present application relates to external turning machining tools which include a vibration damping mechanism. More particularly, the subject matter of the present application pertains to turning tools having a non-blade-shaped cutting portion, instead of blade-shaped cutting portions of the sort commonly found in grooving and/or parting tools.

BACKGROUND OF THE INVENTION

In the current field it is known that the damping effect, or vibration suppression, created by a damping mechanism in a turning tool is influenced mainly by three parameters: A) Damping member weight; B) Distance between a damping member center of mass and the clamping portion which is secured in a CNC machine; and C) Turning tool stiffness. To maximize the damping effect, these parameters are optimized/chosen per the machining application and/or turning tool geometry. In most scenarios, all three parameters are preferably maximized.

Typical damped turning tools of the field have a relatively large length-to-width ratio, and have clamping and cutting portions and a tool body which extends therebetween. In a clamped position in the CNC machine, at least a portion of the clamping portion is rigidly clamped in the CNC machine, while the tool body and cutting portions are cantilevered therefrom. A typical damping mechanism includes a confined, elongated damping member which lies within a damping cavity, or damping recess, along the elongated tool body. The damping member interacts with the turning tool via a viscous and/or elastic material. To maximize the size/weight of the damping member, the required damping recess leaves the tool body with only a thin peripheral envelope. This type of damping mechanism considerably reduces tool stiffness compared to tools with a solid/full tool body which does not include a damping mechanism therein. In summary, the above described damped turning tools maximize the damping member weight, at the expense of tool, or tool body, stiffness and the distance between the damping member center of mass and the clamping portion.

Generally, an effective non-damped turning tool, among other features, must have an appropriately rigid structure and should be cost-efficient. Designing such a tool becomes even more complex, when a damping mechanism is to be implemented. Specifically—finding an appropriate location, orientation and/or enough space for a sufficiently heavy damping member while both preserving tool structure rigidity and proper tool clearance. The current invention provides a vibration damping solution for external turning tools which overcomes the aforementioned problems.

SUMMARY OF THE INVENTION

In accordance with a first aspect of the subject matter of the present application there is provided an external turning tool comprising an elongated tool body having opposite clamping and cutting portions defining an axial direction therebetween;

wherein:
the cutting portion comprises a damping mechanism with an elongated damping member which defines an elongation axis; and wherein the elongation axis forms a non-zero damping member angle with the axial direction.

In accordance with a second aspect of the subject matter of the present application there is provided an external turning tool comprising a turning insert secured in a pocket and a tool body having opposite clamping and cutting portions defining an axial direction therebetween;
wherein
only the cutting portion comprises a damping mechanism with an elongated damping member; and wherein the damping member defines an elongation axis which forms a damping member angle with the axial direction which ranges from 45 to 135 degrees.

In accordance with a third aspect of the subject matter of the present application there is provided an external turning tool having a non-blade-shaped cutting portion comprising a turning insert secured in a pocket and a tool body having opposite clamping and cutting portions defining an axial direction therebetween;
wherein:
only the cutting portion comprises a damping mechanism with an elongated damping member; and wherein the damping member interacts with the tool body via a viscous material.

Any of the following features, either alone or in combination, may be applicable to any of the above aspects of the subject matter of the application:

The damping member angle can range between 45 and 135 degrees.

The damping member angle can range between 80 and 100 degrees.

The turning tool has a tool axis which extends centrally within the tool body parallel to the axial direction and the damping member has a center of mass which is offset from the tool axis.

The damping member has a max member length measured between extremities of the damping member along the elongation axis; and the max member length is larger than a max member thickness measured between extremities in a direction perpendicular to the elongation axis.

The max member length is at least 1.5 times larger than the max member thickness.

The damping member is replaceable with damping members of different weights, each configured, or calibrated, for a specific, or range of damping scenarios.

The cutting portion has an elongated damping recess configured to accommodate the damping member; the damping recess has a recess elongation axis which forms a non-zero damping recess angle with the axial direction.

The cutting portion includes a turning insert, and in a top view of the turning tool, the center of mass of the damping member and the turning insert are located on opposite sides of the tool axis.

The damping mechanism can have an elastic member.

The damping mechanism can have a lid and a calibration mechanism which is configured to apply a permanent force onto the damping member against an elastic member.

The damping member can be entirely confined within the cutting portion. Thus, no portion of the damping member 42 is visible in any view of the cutting portion. Also, the damping member does not extend in a rearward direction into the clamping portion.

The damping member can have chamfers at opposite ends thereof.

The cutting portion has opposite cutting portion side surfaces, and the elongation axis can extend therebetween without intersecting the cutting portion side surfaces.

The cutting portion has opposite cutting portion top and bottom surfaces and the damping recess opens out to exactly one of the cutting portion top and bottom surfaces.

The damping member can have unitary one-piece construction.

The damping member can be cylindrical.

The turning tool further includes a turning insert which has a cutting edge formed at an intersection between an upward-facing rake surface and a forward-facing and/or side-facing relief surface.

The elongation axis can extend parallel or substantially parallel to the relief surface.

The turning tool has coolant conveyance assembly with coolant channels which extend at least through the cutting portion.

A plane perpendicular to the axial direction can intersects both the turning insert and the damping mechanism.

The cutting portion can have a different axial cross-sectional shape than that of the tool body.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figures 1, 2:
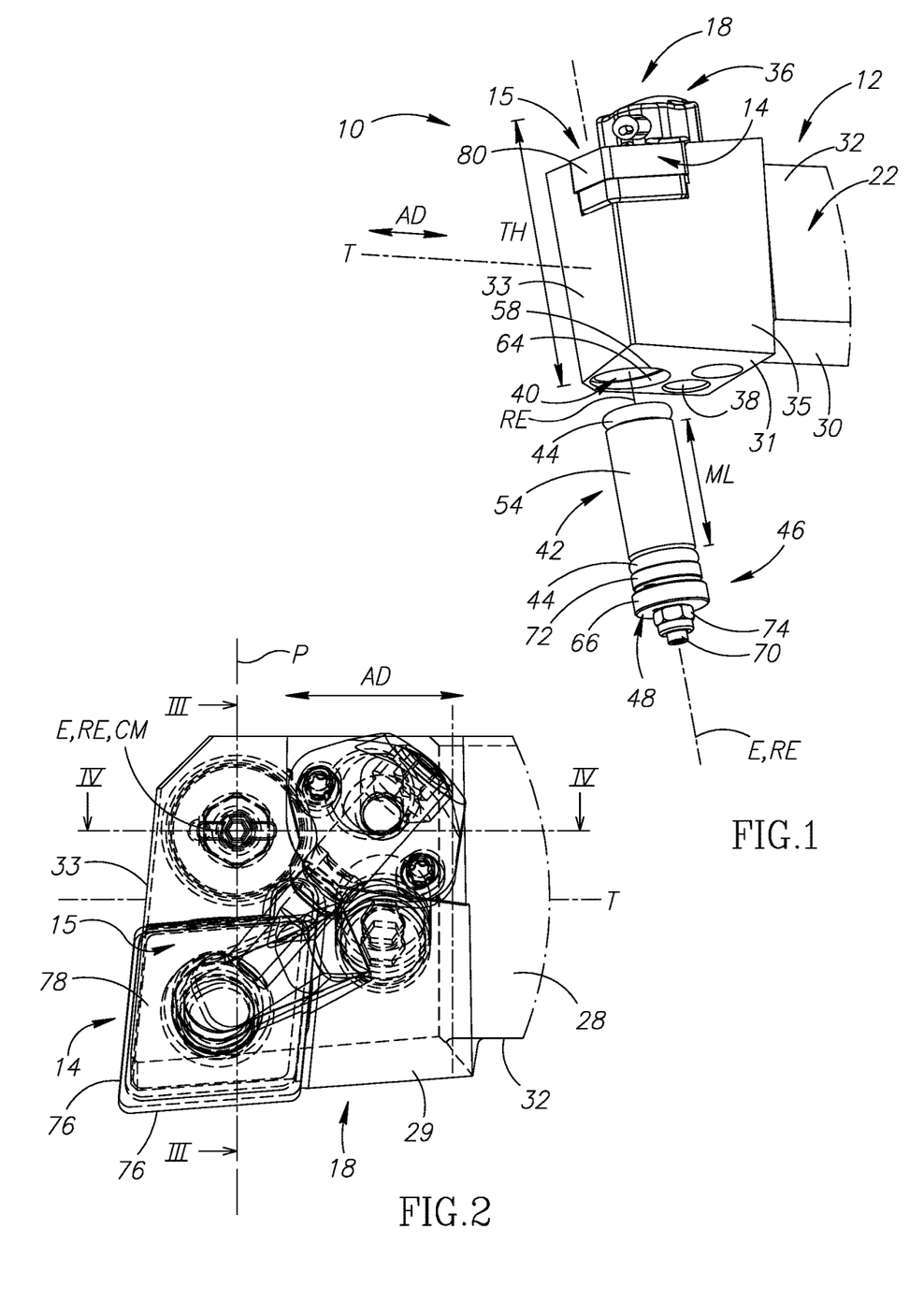
FIG. 1 is an exploded isometric view of a cutting portion of a turning tool with a transverse damping mechanism with a bottom opening.
FIG. 2 is a top view of the turning tool of FIG. 1 showing hidden lines.

Attention is drawn to FIG. 1. A turning tool 10 configured to suppress vibrations includes an elongated tool body 12 and a turning insert 14 secured in a pocket 15. The pocket 15 is configured to accommodate the turning insert 14. The turning insert 14 has at least one cutting edge 76 formed at a meeting between an upward-facing rake surface 78 and a forward-facing and/or side-facing relief surface 80. The turning tool 10 has, at opposite extremities of the tool body 12, a clamping portion 16 and a cutting portion 18. The cutting portion 18 further includes a damping mechanism 20. The elongated tool body 12 defines a longitudinal, or axial direction AD. The term longitudinal, or axial direction refers to any axis which is parallel to an elongation direction of the tool body 12. Specifically, the axial direction AD can be determined by a projection direction of the tool body 12 which is cantilevered from a CNC machine. The turning tool 10 is secured, or coupled into the CNC machine via the clamping portion 16. The axial direction AD can also be perpendicular to a rotation axis of the machined workpiece.

The tool body 12 also defines a centrally extending tool axis T which is parallel to the axial direction AD and passes centrally through the tool body 12. According to the present embodiment, the tool axis T and the axial direction AD both pass through the clamping and cutting portions 16, 18.

The clamping portion 16 is configured to be clamped in a CNC machine, and can have a square cross section taken perpendicular to the tool axis T (axial cross section). When clamped in the CNC machine, the clamping portion 16 is considered as a rigid, static reference point with regard to references to vibration damping in the turning tool 10.

Figures 5, 6, 7:
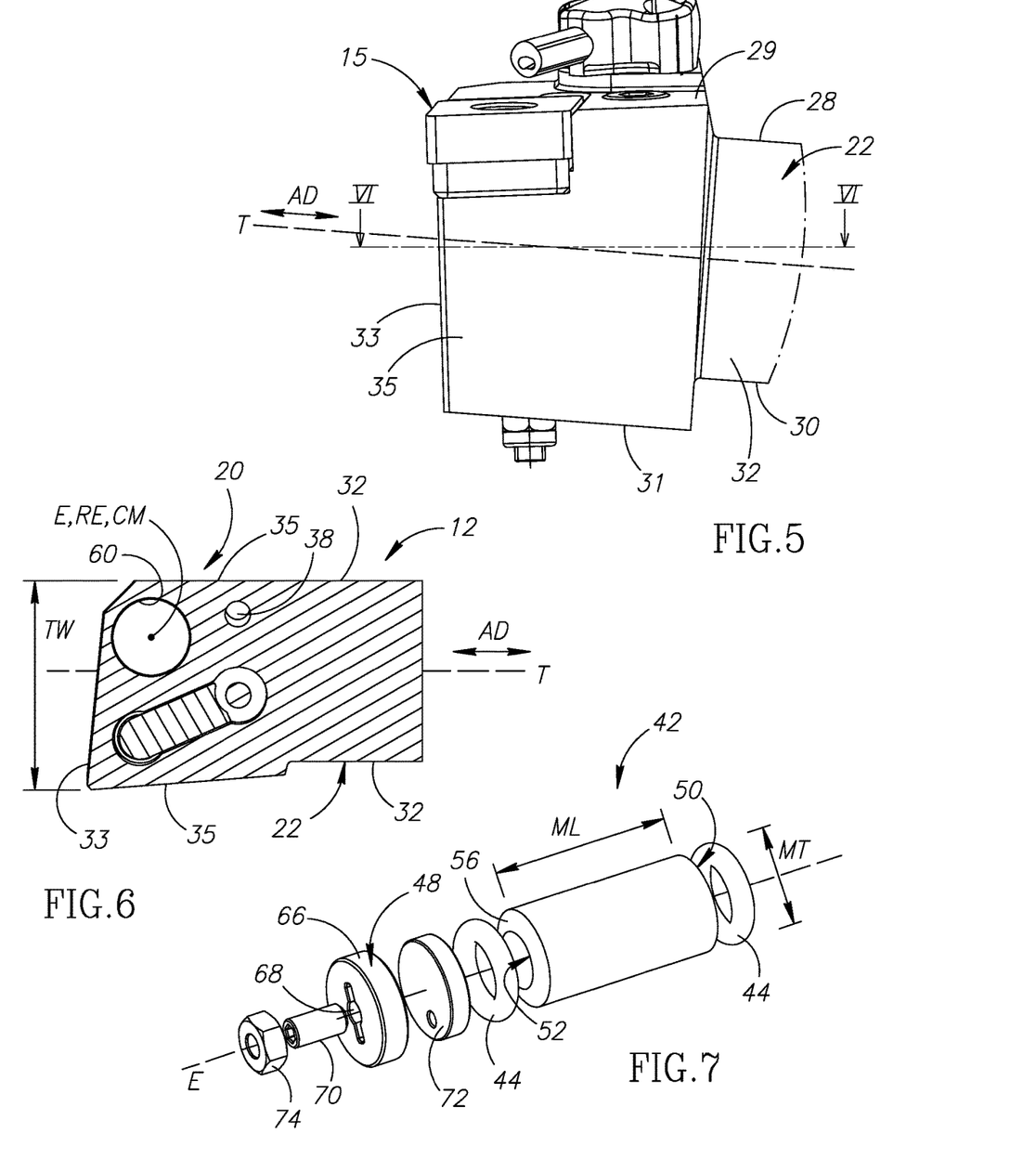
FIG. 5 is a side view of the turning tool of FIG. 1.
FIG. 6 is a cross-sectional view taken along the line VI-VI of FIG. 5.
FIG. 7 is an exploded view of the damping mechanism of FIG. 1.
Figure 8:
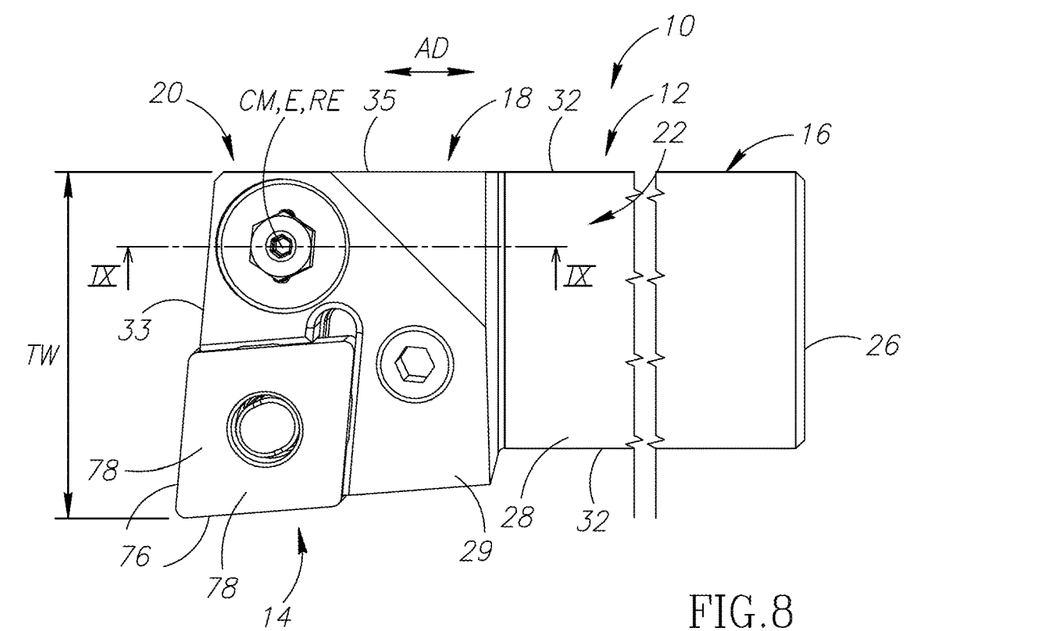
FIG. 8 is a top view of a second embodiment of the turning tool with damping mechanism with a top opening.

Attention is drawn to FIGS. 2, 6 and 8. The tool body 12 has a body peripheral surface 22 which extends along the axial direction AD between the clamping and cutting portions 16, 18. Specifically, the axial direction AD is parallel to the body peripheral surface 22. According to the present embodiment, the body peripheral surface 22 has opposite body top and bottom surfaces 28, 30 and opposite body side surfaces 32 which extend between the body top and bottom surfaces 28, 30. The body peripheral surface 22 can have a square axial cross section taken perpendicular to the axial direction AD. The tool axis T and the axial direction AD are parallel to the body side surfaces 32. The tool axis T and the axial direction AD are also parallel to the body top and bottom surfaces 28, 30. The tool axis T can be located midway between the body side surfaces 32. The tool axis T can be located midway between the body top and bottom surfaces 28, 30.

Figure 4:
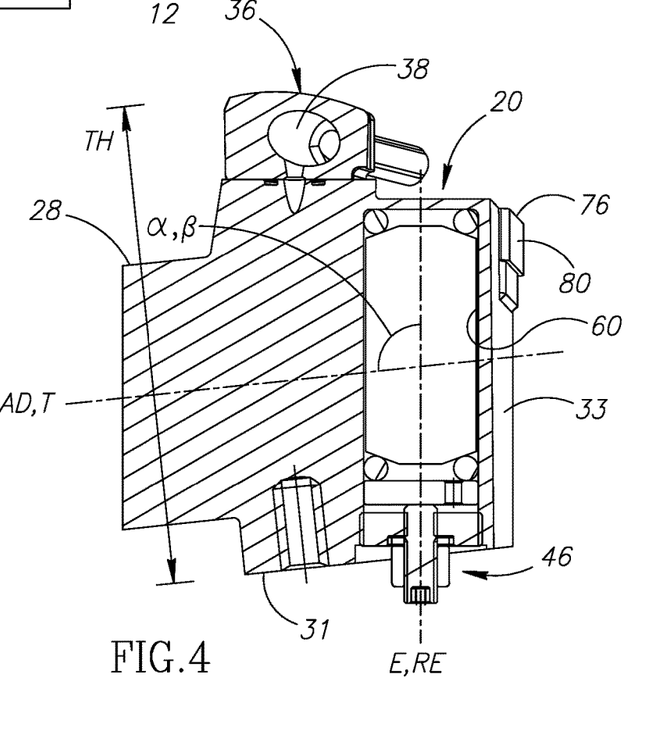
FIG. 4 is a cross-sectional view taken along line IV-IV of FIG. 2.

Attention is drawn to FIGS. 4 and 6. The turning tool 10 has a maximum tool width TW which is measured between outward extremities of the turning tool body 12 in a direction perpendicular to the body side surfaces 32 and in a direction perpendicular to the tool axis T. The turning tool 10 further has a maximum tool height TH which is measured between outward extremities of the tool body 12 in a direction parallel to the body side surfaces 32 and in a direction perpendicular to the tool axis T.

The turning tool 10 has a height to width ratio HWR=TH/TW which is smaller than 3.5 and preferably smaller than 3. According to the present embodiment, the height to width ratio HWR is 1. This dimension ratio relates to available volume (internal or external) in the turning tool 10 where a damping mechanism 20 can be implemented efficiently. Most, if not all blade-shaped tools have a height to width ratio of upwards of 4.5. Parting, or cut-off blade shaped tools are therefore too narrow to internally include a damping mechanism 20 according to the present invention. Specifically, an elongated damping member 42 according to the present application which has an appropriate and effective weight cannot be implemented or be accommodated internally within a blade-shaped machining tool simply because it will not fit.

Attention is drawn to FIGS. 1-4. The cutting portion 18 extends from the tool body 12. The cutting portion 18 has cutting portion top and bottom surfaces 29, 31 which extend from a tool front surface 33 towards the clamping portion 16. The cutting portion 18 further has cutting portion side surfaces 35 which extend between the cutting portion top and bottom surfaces 29, 31. The cutting portion 18 includes at least one pocket 15 and a turning insert 14 secured therein. The cutting portion 18 can further include a coolant conveying assembly 36 and coolant channels 38 which extend at least through the cutting portion 18. According to the present embodiment, the cutting portion 18 has a different axial cross section shape than that of the tool body 12. According to the present embodiment, the cutting portion 18 extends in the axial direction AD with the pocket 15 formed at the forwardmost axial end of the cutting portion 18.

According to the present embodiments, the damping mechanism 20 includes an elongated damping recess 40, an elongated damping member 42 ("damping weight" 42), at least one elastic member 44, a calibration mechanism 46 and a lid 48.

Attention is drawn to FIG. 2. According to the present embodiment, the damping member 42 is entirely confined within the cutting portion 18. Stated differently, in the present example, no portion of the damping member 42 protrudes outwardly from the cutting portion 18. Thus, no portion of the damping member 42 is visible in any view of the cutting portion. Also, the damping member 42 does not overlap the clamping portion 16 in the axial direction AD and does not extend in a rearward direction into the clamping portion. As seen from FIGS. 2-4, the damping member 42 is shorter in the axial direction AD than in at least one direction perpendicular to the axial direction AD. The damping member is made from a material with a relatively high density to achieve a high weight-to-volume ratio. The damping member 42 can be made of Tungsten. In the current example, the damping member 42 is made of a single piece of material and thus has unitary one-piece construction.

The damping member 42, and especially a center of mass CM thereof, is located adjacent the tool front surface 33 at a location which is farthest possible from the clamping portion 16. In the present embodiments, the pocket 15 and the damping mechanism 20 at least partially overlap in the axial direction AD. In other words, a plane P perpendicular to the axial direction AD intersects both pocket 15 and the damping mechanism 20.

These orientation-related features relate to advantageous design which places the damping mechanism 20 at the cutting portion 18 to avoid compromising the structural integrity and/or stiffness of the tool body 12.

Figure 3:
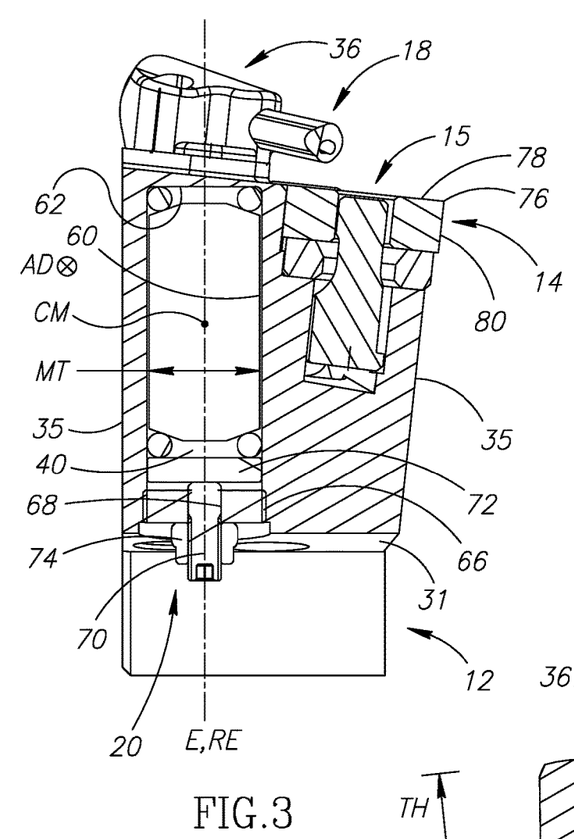
FIG. 3 is a cross-sectional view taken along line III-III of FIG. 2.

Attention is drawn to FIG. 7. The damping member 42 can have first and second end surfaces 50, 52 and a member peripheral surface 54 which extends therebetween. According to the present embodiment, the member peripheral surface 54 does not include a thread. The damping member 42 has a central elongation axis E which passes through the first and second end surfaces 50, 52. The elongation axis E extends in a damping member elongation direction. In other words, the elongation axis E extends along the longest dimension of the damping member 42. The elongation axis E forms a non-zero damping member angle α with the axial direction and with the tool axis T (FIG. 4). The damping member angle α ranges preferably between 45 and 135 degrees. In the present example, the damping member angle α is 96 degrees. The damping member angle α can be determined by tool geometry, i.e., in accordance with design efforts to maximize the available space/volume for the damping member 42 and consequently—its weight. The damping member angle α, can also be affected by other recesses in the cutting portion 18 such as the pocket 15 and/or coolant conveying assembly 36. Furthermore, in an axial view along the tool axis T, the orientation of the damping member 42, and consequently the elongation axis E is preferably upright, as seen in FIG. 3. In other words, in the present embodiments, the elongation axis E extends between the cutting portion side surfaces 35 without intersecting either. In the present embodiments, as seen in FIG. 4, the elongation axis E is parallel, or substantially parallel to the tool front surface. According to the present embodiments, during machining, the elongation axis E extends parallel, or substantially parallel, to an operative relief surface 80 which extends from an operative cutting edge 76 that cuts the workpiece.

According to the present example, the member peripheral surface 54 has a cylindrical shape, the central axis of which coincides with the elongation axis E. The center of mass CM is defined by a vertex. According to the present embodiment, the center of mass CM lies on the elongation axis E. According to the present embodiments, the damping member 42 is not centered with respect to the tool body 12. In other words, in the present embodiment, the center of mass CM does not lie in the tool axis T. Specifically, in a top view of the cutting portion 18, or a plan view of the cutting portion top surface 29 (as seen in FIG. 2), a projection of the center of mass CM is offset from the tool axis T. This is advantageous, since the deviation, or lever arm, of the damping member 42 with respect to the tool axis T enables the damping member 42 to generate a suppression counter torque against torsional vibrations generated by machining forces. This is true in the present embodiments where the pocket 15 is also not centered with respect to the tool axis T. According to the present embodiment, in a top view of the cutting portion 18, or a plan view of the cutting portion top surface 29, as shown in FIG. 2, the center of mass CM and the turning insert 14 are preferably located at opposite sides of the tool axis T. As seen in FIG. 2, the center of mass CM is not located directly beneath, or under, the turning insert 14. In other words, in a plan view of the rake surface 78, the center of mass CM does not overlap a projection of the turning insert 14.

Figure 10:
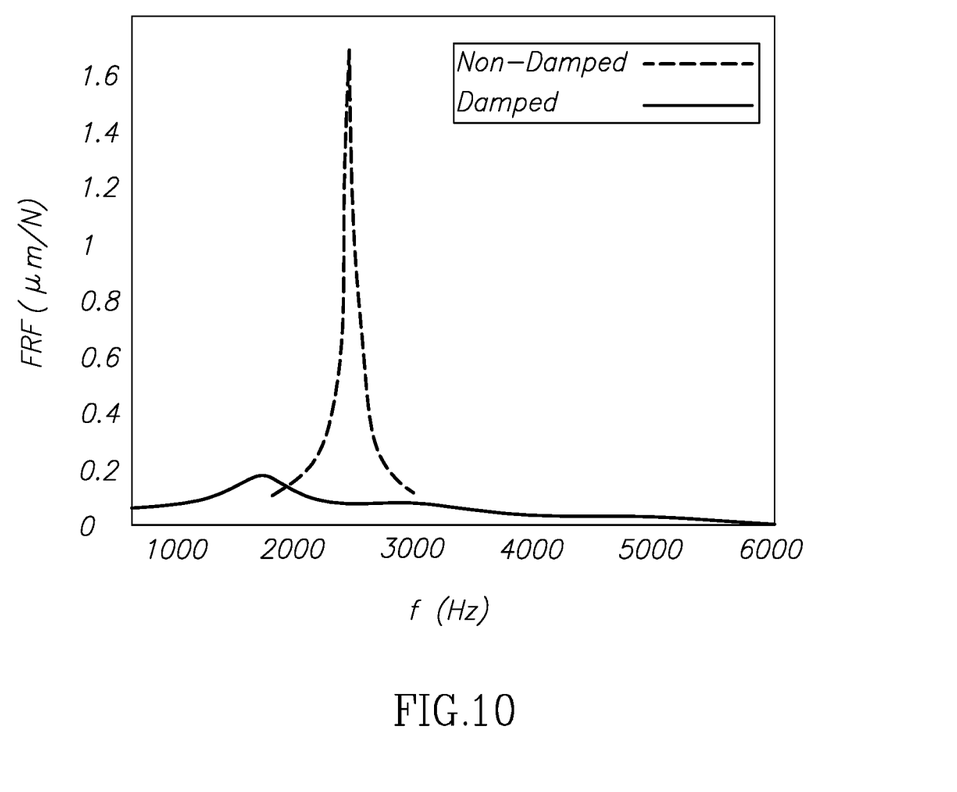
FIG. 10 is a Modal test result graph showing two Frequency Response Functions (FRF) representing, respectively, the same turning tool with and without a damping mechanism.

The damping member 42 has a maximum member length ML measured between extremities of the damping member 42 along the elongation axis E. The damping member 42 also has a maximum member thickness MT measured between extremities thereof in a direction perpendicular to the elongation direction. It is understood that when the damping member 42 has a cylindrical body, the maximum member thickness MT corresponds to the diameter of the cylindrical body. The maximum member length ML is larger than the maximum member thickness MT. The maximum member length ML is preferably 1.2 times larger than the maximum member thickness MT. In other words, the damping member 42 has a length to thickness ratio ML/MT=LTR>1.2. According to the present embodiment, the length to thickness ratio LTR is 1.5. This ratio relates directly to optimization of the shape of the damping member 42 to the available volume and to production restrictions in turning tools having a non-blade-shaped cutting portion. Specifically, the elongated shape has a bigger rotational inertia than, e.g., a spherical or a cube shaped damping member. In addition, the elongated shape enables compactness, while avoiding various mechanisms of the turning tool 10 such as an insert clamping mechanism in the pocket 15, or coolant channels 38. In the current turning tool 10, it was found that the current position and orientation of the damping mechanism 20 is preferable in terms of maximum weight achieved in a relatively small confined volume, production efficiency and damping test results (as shown in FIG. 10). As previously mentioned, increasing the damping member 42 weight and distance from the clamping portion 16 becomes more significant as the distance between the cutting portion 18 and the clamping portion 16 increases, i.e., longer tools means larger projection from the CNC machine which leads to an increase in vibrations caused by machining.

The damping member 42 can have two chamfers 56. Each chamfer 56 extends between the member peripheral surface 54 and each of the first and second end surfaces 50, 52. In a cross section along the elongation axis E, the chamfer 56 can appear straight. Each chamfer 56 is configured to abut the elastic member 44.

The damping recess 40 is elongated and configured to accommodate the elongated damping member 42. According to the present embodiment, the damping recess 40 is a blind hole, or recess, i.e., includes only a single opening 58. According to the present embodiment, the damping recess 40 only opens out to, and the opening 58 is located in, the cutting portion bottom surface 31. This allows for a clean, protrusion-free, cutting portion top surface 29 which gives way for uninterrupted chip flow. Furthermore, this smooth upper surface is subjectively aesthetic, which is regarded as advantageous in terms of marketing value.

Figure 9:
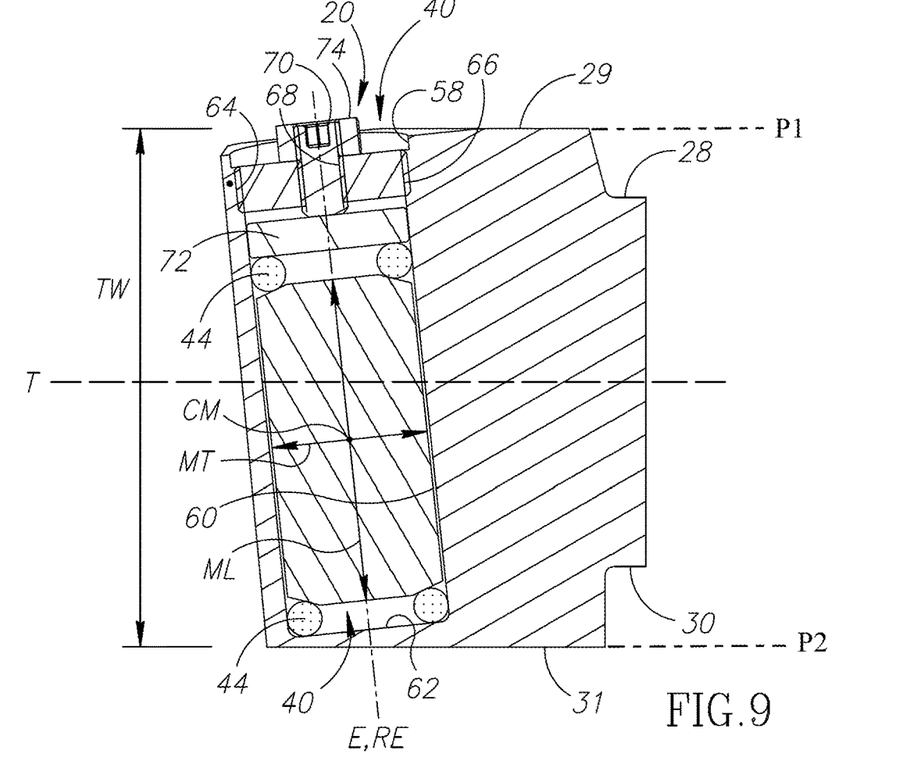
FIG. 9 is a cross-sectional view taken along line IX-IX of FIG. 8.

Attention is drawn to FIGS. 1-4 and 9. The damping recess 40 has a recess elongation axis RE along which the damping recess extends longitudinally. The recess elongation axis RE forms a non-zero damping recess angle β with the axial direction AD. The damping recess angle β ranges preferably between 45 and 135 degrees. According to the present embodiments the damping recess angle β measures 96 degrees. It is understood that when the damping mechanism 20 is installed and the tool is non-operative, the damping weight's elongation axis E and the recess elongation axis RE are aligned. As seen in FIG. 9, both the damping weight's elongation axis E and the aligned recess elongation axis RE intersect imaginary planes P1, P2 defined by the cutting portion's top and bottom surfaces 29, 31, respectively.

The damping recess 40 can have a recess wall 60 which extends from a recess base surface 62 located at an innermost portion of the damping recess 40 along the recess elongation axis RE. As seen in FIG. 3, the recess wall 60 is centered about the recess elongation axis RE and in some embodiments is parallel to the recess elongation axis RE. The recess wall 60 can be cylindrical. The recess wall 60 can open out to the body bottom surface 30. At or adjacent the opening 58, the recess wall 60 can have a recess female thread 64 configured to receive and correspond with an external male lid thread 66 of the lid 48. The lid 48 can also have an internal female lid thread 68 which is configured to receive and correspond with an adjustment screw 70, as will further explained below.

According to the present embodiment, the damping mechanism 20 has two elastic members 44. Each elastic member 44 can abut a respective chamfer 56. Each elastic member 44 can be an elastic O-ring made of rubber.

According to the present embodiment, in an assembled position of the damping mechanism 20, the calibration mechanism 46 can include, in the following order: a pressure plate 72, the adjustment screw 70, the lid 48 and a locating nut 74. The pressure plate 72 is located between a first end of the adjustment screw 70 and the elastic member 44, the adjustment screw 70 is threaded into the internal female lid thread 68, and the locating nut 74 is threaded at a second end of the adjustment screw 70. Once the lid 48 has been firmly tightened into the recess female thread 64, the adjustment screw 70 can be turned to calibrate the damping mechanism 20, i.e., to adjust the amount of force exerted onto the respective elastic member 44 via the pressure plate 72 which spreads the forces across the elastic member 44. Once the damping mechanism 20 has been properly calibrated, i.e., the desired force has been achieved, the locating nut 74 is tightened to preserve the current calibration, or adjustment screw 70 location. The calibration mechanism 46 thus applies a permanent force to the damping weight 42 against the elastic member 44, the permanent force being applied in the same direction as the elongation axis E.

Attention is drawn to FIGS. 8 and 9. According to a second embodiment, the damping recess 40 opens out only to the body top surface 28. The rest of the features of the damping mechanism 20 are similar or identical to the first embodiment disclosed above.

What is claimed is:

1. A non-blade shaped external turning tool (10) comprising:
    an elongated tool body (12) having opposite clamping and cutting portions (16, 18) defining an axial direction (AD) therebetween, the axial direction (AD) establishing a forward-to-rearward direction of the tool body (12) with the cutting portion (18) being axially forward of the clamping portion (16);
    the cutting portion (18) comprising:
        cutting portion top and bottom surfaces (29, 31);
        cutting portion side surfaces (35) extending between the cutting portion top and bottom surfaces (29, 31);
        an elongated damping recess (40) formed in the cutting portion (18), the damping recess (40) extending longitudinally along a recess elongation axis (RE) and comprising a recess wall (60) centered about the recess elongation axis (RE), the damping recess (40) being in the form of a blind hole having an opening (58) which opens out to exactly one of the cutting portion top and bottom surfaces (29, 31); and
        a damping mechanism (20) comprising an elongated damping weight (42) having an elongation axis (E) aligned with the recess elongation axis (RE), the damping weight (42) occupying the damping recess (40); wherein:
    the damping mechanism (20) further comprises an elastic member (44);
    the elongation axis (E) forms a non-zero damping member angle (α) with the axial direction (AD); and
    the elongation axis (E) and the recess elongation axis (RE) both pass through the opening (58) and intersect imaginary planes (P1, P2) defined by the top and bottom surfaces (29, 31).

2. The external turning tool (10) according to claim 1, wherein the damping member angle (α) ranges from 45 to 135 degrees.

3. The external turning tool (10) according to claim 1, wherein the damping member angle (α) ranges from 80 to 100 degrees.

4. The external turning tool (10) according to claim 1, wherein:

the external turning tool (10) has a tool axis (T) which extends centrally within the tool body (12), parallel to the axial direction (AD); and the damping weight (42) has a center of mass (CM) which is offset from the tool axis (T).

5. The external turning tool (10) according to claim 1, wherein:

the damping weight (42) has a maximum member length (ML) measured between extremities of the damping weight (42) along the elongation axis (E); and the maximum member length (ML) is larger than a maximum member thickness (MT) measured between extremities in a direction perpendicular to the elongation axis (E).

6. The external turning tool (10) according to claim 5, wherein the maximum member length (ML) is at least 1.5 times larger than the maximum member thickness (MT).

7. The external turning tool (10) according to claim 1, wherein:

the damping mechanism (20) further comprises a lid (48) and a calibration mechanism (46) which is configured to apply a permanent force onto the damping weight (42) against an elastic member (44), the permanent force being applied in a direction parallel to the elongation axis (E).

8. The external turning tool (10) according to claim 1, wherein the damping weight (42) is entirely confined within the cutting portion (18), such that no portion of the damping weight (42) is visible in any view of the cutting portion.

9. The external turning tool (10) according to claim 1, wherein the elongation axis (E) does not intersect the cutting portion side surfaces (35).

10. The external turning tool (10) according to claim 1, wherein the damping weight (42) has unitary one-piece construction.

11. The external turning tool (10) according to claim 1, wherein the damping weight (42) is cylindrical.

12. The external turning tool (10) according to claim 1, further comprising a coolant channel (38) which extends at least through the cutting portion (18).

13. The external turning tool (10) according to claim 1, wherein:

the cutting portion (18) has a different cross-sectional shape than that of the clamping portion (16), in cross-sections taken perpendicular to the axial direction (AD).

14. The external turning tool (10) according to claim 1, wherein the damping weight (42) does not overlap the clamping portion (16) in the axial direction (AD) and does not extend in a rearward direction into the clamping portion (16).

15. The external turning tool (10) according to claim 1, further comprising:

a turning insert (14) removably retained in a pocket (15) of the cutting portion (16).

16. The external turning tool (10) according to claim 15, wherein:

the turning insert (14) comprises a cutting edge (76) formed at an intersection between a rake surface (78) and a relief surface (80); and the elongation axis (E) extends parallel or substantially parallel to the relief surface (78).

17. The external turning tool (10) according to claim 15, wherein a plane (P) perpendicular to the axial direction (AD) intersects both the turning insert (14) and the damping mechanism (20).

18. The external turning tool (10) according to claim 15, wherein:

in a top view of the external turning tool (10), a center of mass (CM) of the damping weight (42) is not located directly under the turning insert (14).

19. The external turning tool (10) according to claim 15, wherein:

the external turning tool (10) has a tool axis (T) which extends centrally within the tool body (12) parallel to the axial direction (AD), and in a top view of the external turning tool (10), a center of mass (CM) of the damping weight (42) and the turning insert (14) are located on opposite sides of the tool axis (T).

20. The external turning tool (10) according to claim 15, wherein:

the damping weight (42) is entirely confined within the cutting portion (16) such that no portion of the damping weight (42) is visible in any view of the cutting portion (16); and the damping member angle ($\alpha$) ranges from 45 to 135 degrees.

21. The external turning tool (10) according to claim 20, wherein the cutting portion (18) has a different cross-sectional shape than that of the clamping portion (16), in cross-sections taken perpendicular to the axial direction (AD).

22. The external turning tool (10) according to claim 20, wherein the damping weight (42) does not overlap the clamping portion (16) in the axial direction (AD) and does not extend in a rearward direction into the clamping portion (16).

23. The external turning tool (10) according to claim 15, wherein:

the damping weight (42) is entirely confined within the cutting portion (16) such that no portion of the damping weight (42) is visible in any view of the cutting portion (16); and the damping weight (42) interacts with the tool body (12) via a viscous material.

24. The external turning tool (10) according to claim 23, wherein the cutting portion (18) has a different cross-sectional shape than that of the clamping portion (16), in cross-sections taken perpendicular to the axial direction (AD).

25. The external turning tool (10) according to claim 23, wherein the damping weight (42) does not overlap the clamping portion (16) in the axial direction (AD) and does not extend in a rearward direction into the clamping portion (16).

26. The external turning tool (10) according to claim 1, wherein:

the damping weight (42) is shorter in the axial direction (AD) than in at least one direction perpendicular to the axial direction (AD).

27. A non-blade shaped external turning tool (10), comprising:

an elongated tool body (12) having opposite clamping and cutting portions (16, 18) defining an axial direction (AD) therebetween, the axial direction (AD) establishing a forward-to-rearward direction of the tool body (12) with the cutting portion (18) being axially forward of the clamping portion (16); and a damping mechanism (20) at the cutting portion (18), the damping mechanism (20) comprising an elongated damping weight (42) having an elongation axis (E); wherein:

the cutting portion (18) has an elongated damping recess (40) which accommodates the damping weight (42); and the damping mechanism (20) further comprises a lid (48) and a calibration mechanism (46) which is configured to apply a permanent force onto the damping weight (42) against an elastic member (44), the permanent force being applied in a direction parallel to the elongation axis (E).

28. The non-blade shaped external turning tool (10) according to claim 27, wherein:

the cutting portion (18) has a different cross-sectional shape than that of the clamping portion (16), in cross-sections taken perpendicular to the axial direction (AD);

the damping weight (42) does not overlap the clamping portion (16) in the axial direction (AD) and does not extend in a rearward direction into the clamping portion (16); and the damping weight (42) is entirely confined within the cutting portion (18), such that no portion of the damping weight (42) is visible in any view of the cutting portion (18).

29. The non-blade shaped external turning tool (10) according to claim 27, wherein:

the cutting portion (18) comprises:
cutting portion top and bottom surfaces (29, 31); and
cutting portion side surfaces (35) extending between the cutting portion top and bottom surfaces (29, 31); and the elongation axis (E) intersects at least one of the cutting portion top and bottom surfaces (29, 31).

* * * * *